United States Patent [19]

Sugiyama

[11] Patent Number: 4,558,362
[45] Date of Patent: Dec. 10, 1985

[54] DIGITAL VIDEO SIGNAL TRANSMITTING APPARATUS

[75] Inventor: Hiroyuki Sugiyama, Isehara, Japan

[73] Assignee: Victor Company of Japan, Ltd., Japan

[21] Appl. No.: 463,933

[22] Filed: Feb. 4, 1983

[30] Foreign Application Priority Data

Feb. 9, 1982 [JP] Japan ............................ 57-19067

[51] Int. Cl.⁴ .............................................. H04N 7/12
[52] U.S. Cl. .................................................. 358/138
[58] Field of Search ................ 358/138, 160, 133, 135

[56] References Cited

U.S. PATENT DOCUMENTS

| 3,769,452 | 10/1973 | Stone | 358/138 |
| 3,792,196 | 2/1974 | Wendland | 358/138 |
| 4,025,950 | 5/1977 | Matsumoto et al. | 358/138 |
| 4,068,265 | 1/1978 | Russell | 358/138 |
| 4,286,291 | 8/1981 | Taylor et al. | 358/138 |
| 4,292,652 | 9/1981 | Yumde et al. | 358/138 |
| 4,425,588 | 1/1984 | Baldwin | 358/138 |

FOREIGN PATENT DOCUMENTS 1573105  8/1980  United Kingdom .
2069294  8/1981  United Kingdom .

OTHER PUBLICATIONS

G. A. Reitmeier "Spatial Compression and Expansion of Digital Television Images", RCA Review, 1981, vol. 42, pp. 3-59.

Primary Examiner—Edward L. Coles, Sr.
Attorney, Agent, or Firm—Andrus, Sceales, Starke & Sawall

[57] ABSTRACT

A digital video signal transmitting apparatus comprises a memory which is written in with a digital video signal of selected picture elements selected from among all picture elements arranged in a matrix form constituting one picture frame, where the selected picture elements are arranged at zigzag positions along either a horizontal direction or a vertical direction in the matrix form arrangement, and a control circuit for carrying out read-out control to read out a digital video signal. The memory control circuit carries out the read-out control so that signals of the selected and written in picture elements are read out as they are from the memory, and signals of selected and written in picture elements near picture elements which were not selected and not written in are read out instead of signals of the picture elements which were not selected and not written in.

7 Claims, 15 Drawing Figures

| 1 |   | 2 |   | 3 |   | 4 |   |
|---|---|---|---|---|---|---|---|
|   | 5 |   | 6 |   | 7 |   | 8 |
| 9 |   | 10|   | 11|   | 12|   |
|   | 13|   | 14|   | 15|   | 16|
| 17|   | 18|   | 19|   | 20|   |
|   | 21|   | 22|   | 23|   | 24|
| 25|   | 26|   | 27|   | 28|   |
|   | 29|   | 30|   | 31|   | 32|

FIG. 3B

| 1 | 5 | 2 | 6 | 3 | 7 | 4 | 8 |
|---|---|---|---|---|---|---|---|
| 9 | 13| 10| 14| 11| 15| 12| 16|
| 17| 21| 18| 22| 19| 23| 20| 24|
| 25| 29| 26| 30| 27| 31| 28| 32|
|   |   |   |   |   |   |   |   |
|   |   |   |   |   |   |   |   |
|   |   |   |   |   |   |   |   |
|   |   |   |   |   |   |   |   |

FIG. 3C

| 1 | 5 | 2 | 6 | 3 | 7 | 4 | 8 |
|---|---|---|---|---|---|---|---|
| 1 | 5 | 2 | 6 | 3 | 7 | 4 | 8 |
| 9 | 13| 10| 14| 11| 15| 12| 16|
| 9 | 13| 10| 14| 11| 15| 12| 16|
| 17| 21| 18| 22| 19| 23| 20| 24|
| 17| 21| 18| 22| 19| 23| 20| 24|
| 25| 29| 26| 30| 27| 31| 28| 32|
| 25| 29| 26| 30| 27| 31| 28| 32|

FIG. 4A

| 1 | 5 | 2 | 6 | 3 | 7 | 4 | 8 |
|---|---|---|---|---|---|---|---|
| 9 | 13| 10| 14| 11| 15| 12| 16|
| 17| 21| 18| 22| 19| 23| 20| 24|
| 25| 29| 26| 30| 27| 31| 28| 32|
|   |   |   |   |   |   |   |   |
|   |   |   |   |   |   |   |   |
|   |   |   |   |   |   |   |   |
|   |   |   |   |   |   |   |   |

FIG. 4B

| 1 | 5 | 2 | 6 | 3 | 7 | 4 | 8 |
|---|---|---|---|---|---|---|---|
| 9 | 5 | 10| 6 | 11| 7 | 12| 8 |
| 9 | 13| 10| 14| 11| 15| 12| 16|
| 17| 13| 18| 14| 19| 15| 20| 16|
| 17| 21| 18| 22| 19| 23| 20| 24|
| 25| 21| 26| 22| 27| 23| 28| 24|
| 25| 29| 26| 30| 27| 31| 28| 32|
|   | 29|   | 30|   | 31|   | 32|

DIGITAL VIDEO SIGNAL TRANSMITTING APPARATUS

BACKGROUND OF THE INVENTION

The present invention generally relates to digital video signal transmitting apparatuses, and more particularly to an apparatus which stores a digital video signal into a memory device (hereinafter simply referred to as a memory) having a small memory capacity and reads out the stored digital video signal to transmit the digital video signal.

A recording and reproducing system has been proposed wherein a digital video signal and a digital audio signal are recorded onto a rotary recording medium upon recording. The digital video signal is obtained by subjecting a video signal to digital pulse modulation such as pulse code modulation (PCM), and the digital audio signal is similarly obtained by subjecting an audio signal to digital pulse modulation. Upon reproduction, the recorded signal is reproduced from the rotary recording medium, and an analog audio signal is obtained from the reproduced signal to reproduce the analog audio signal as reproduced sound while an analog video signal is obtained from the reproduced signal to reproduce the analog video signal as still picture, for example. Such a recording and reproducing system is being reduced to practice.

In the above described system, a signal corresponding to one frame of the reproduced digital video signal is stored into a memory (a so-called frame memory), and the stored signal is read out from this memory to be subjected to digital-to-analog conversion. The converted signal is supplied to a television receiver, and reproduced as a still picture. In this type of a conventional digital video signal transmitting apparatus, signals corresponding to all picture elements on a screen for one frame of video information are stored in the memory. Accordingly, even if a composite synchronizing signal, color burst signal, and the like are not stored into the memory, the memory still must have a considerably large memory capacity. Therefore, an expensive memory must be used, and there was a disadvantage in that the cost of the digital video signal transmitting apparatus as a whole became high.

Hence, a method was tested according to which a signal corresponding to one field within one frame of the reproduced digital video signal is stored into a memory (a so-called field memory), and the stored signal is repeatedly read out from this memory, to obtain one frame of reproduced still picture signal from the identical signals of two fields thus read out from the memory. According to this method, the memory only requires a memory capacity for one field, and may be manufactured at a lower cost compared to the one frame memory described before. However, according to this method, the video information is only stored for every other lines (horizontal scanning lines) within the picture of one frame. Thus, there was a disadvantage in that the vertical resolution of the reproduced picture became degraded to one-half.

SUMMARY OF THE INVENTION

Accordingly, it is a general object of the present invention to provide a novel and useful digital video signal transmitting apparatus in which the above described disadvantages have been overcome.

Another and more specific object of the present invention is to provide a digital video signal transmitting apparatus in which a digital video signal is sampled in correspondence with picture elements selected with a predetermined order from among all picture elements constituting a picture, and the sampled signals are stored into a memory device and read out from the memory device in a predetermined order, to obtain one frame of video signal. According to the apparatus of the present invention, a memory device having a small memory capacity may be used, to enable the apparatus to be manufactured at low cost.

Still another object of the present invention is to provide a digital video signal transmitting apparatus in which, among the signals of picture elements which were sampled and stored, the signals of picture elements postioned near picture elements which were not sampled and stored are read out as approximation signals upon read-out from the memory to be used instead of signals of the picture elements which were not sampled and stored. According to the apparatus of the present invention, the sampling frequency is low, however, the substantial or apparent sampling frequency is not low because of the use of the above approximation signals, and aliasing noise is thus exceedingly low.

Another object of the present invention is to provide a digital video signal transmitting apparatus designed to store signals of picture elements selected in a quincunx form from among all the picture elements upon storage, and the signals of picture elements which were not stored as substituted by the signals read out from the memory. According to the apparatus of the present invention, the signals of the picture elements within all the scanning lines are selected, and there is no apparent degradation in the vertical resolution of the reproduced picture.

Other objects and further features of the present invention will be apparent from the following detailed description when read in conjunction with the accompanying drawings.

DETAILED DESCRIPTION

Figure 1:
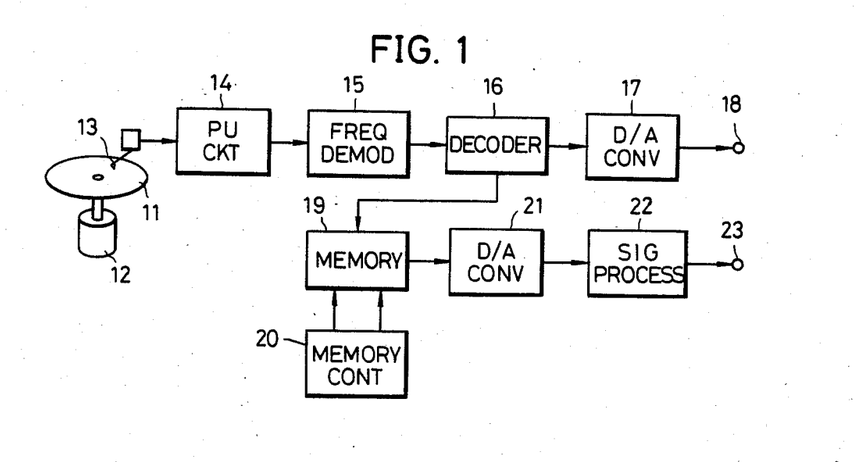
FIG. 1 is a systematic block diagram showing an embodiment of a digital video signal transmitting apparatus according to the present invention.

In FIG. 1, a digital audio signal and a digital video signal obtained through digital pulse modulation, are recorded on a rotary recording medium (hereinafter simply referred to as a disc) 11. The video information of the digital video signal is an information in terms of pictures of one frame related to the audio information of the digital audio signal. However, horizontal and vertical synchronizing signals, color burst signal, and the like are not included within the digital video signal. The disc 11 is rotated by a motor 12, and the signal recorded on the disc 11 are reproduced by a pickup device 13. This pickup device 13 may be an electrostatic capacitance type pickup device which picks up the signal as variations in electrostatic capacitance, or a so-called optical type pickup device which picks up the signal by use of a laser light.

The signal thus picked up by the pickup device 13 is supplied to a frequency demodulator 15, through a pickup circuit 14 which includes a preamplifier. The picked up signal is thus frequency demodulated at the frequency demodulator 15, and the demodulated digital signal is supplied to a decoder 16. A predetermined signal processing such as error correction is carried out at the decoder 16. A digital audio signal from the decoder 16 is converted into an analog signal at a digital-to-analog (D/A) converter 17, and the analog audio signal is obtained through an output terminal 18.

As will be described hereinafter, the digital video signal from the decoder 16 is written into a memory 19 under the control of a memory controller 20. Next, the signal stored in the memory 19 is read out under the control of the memory controller 20. The digital video signal thus read out from the memory 19 is supplied to a D/A converter 21 wherein the digital video signal is converted into an analog video signal. Horizontal and vertical synchronizing signals, color burst signal, and the like are added to the output analog video signal of the D/A converter 21 at a processing circuit 22, and as a result, an analog composite video signal is obtained through an output terminal 23.

Next, description will be given with respect to various embodiments of methods of carrying out write-in and read-out with respect to the memory 19 under the control of the memory controller 20.

Figure 2:
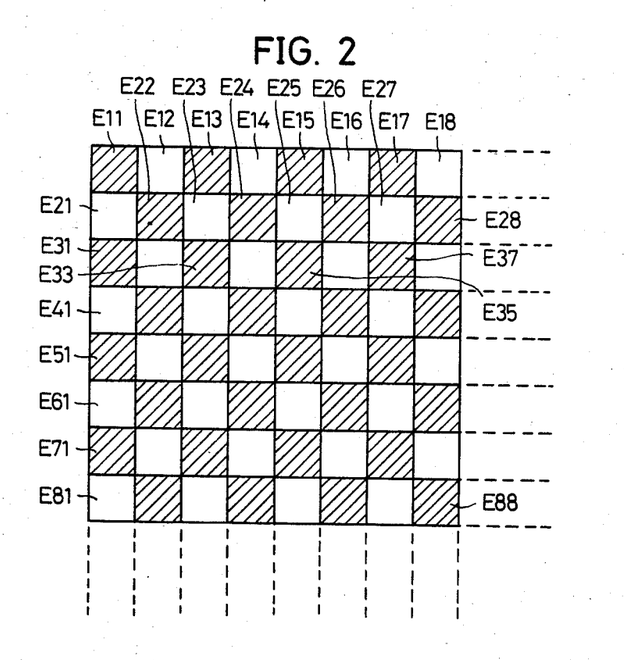
FIG. 2 is a diagram for explaining positions of picture elements corresponding to signals of picture elements which are to be written into a memory by the block system shown in FIG. 1.

The video information of the digital video signal supplied to the memory 19 from the decoder 16, comprises video information of all picture elements in one frame as shown in FIG. 2, for example. In FIG. 2, each square box indicates one picture element. With respect to each of the picture elements, the picture elements in a first line (a first row indicating a first horizontal scanning line) are designated by reference characters $E11$, $E12$, $E13$, ..., $E172$ from the left to right, and the picture elements beyond the picture element $E19$ are omitted and shown in FIG. 2. The picture elements in a second line (a second row indicating a second horizontal scanning line) are designated by reference characters $E21$, $E22$, $E23$, ... from the left to right. Similarly, the picture elements in a first column are designated by reference characters $E11$, $E21$, $E31$, ..., $E5721$ from the top, and the picture elements beyond the picture element $E91$ are omitted and not shown in FIG. 2.

In a first embodiment of the apparatus according to the present invention, every other picture element from the picture element $E11$ in the first column, that is, $E11$, $E13$, $E15$, $E17$, ... in the first line, every other picture element from the picture element $E22$ in the second column, that is, $E22$, $E24$, $E26$, $E28$, ... in the second line, and every other picture element from the picture element $E31$ in the first column, that is, $E31$, $E33$, $E35$, $E37$, ... in the third line, are respectively sampled and written (stored) into the memory 19. The picture elements in the lines beyond the third line are similarly written into the memory 19, and as a result, the picture elements indicated by shaded boxes in FIG. 2 are sampled and written into the memory 19. As clearly seen from FIG. 2, the picture elements of the signals written into the memory 19 are in the form of a quincunx.

Figure 3A:
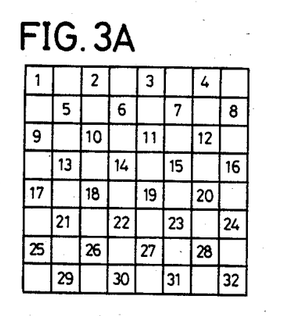
FIGS. 3A, 3B, and 3C respectively are a diagram showing positions of picture elements corresponding to signals of picture elements which are to be written into the memory by the block system shown in FIG. 1, a diagram showing signals of picture elements written into the memory, and a diagram showing picture elements on a reproduced picture obtained by the signals of picture elements read out from the memory.
Figure 3B:
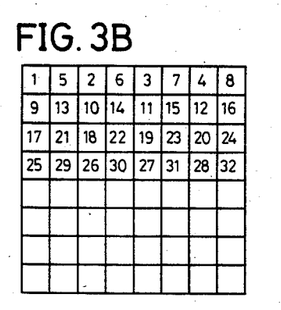

In order to simplify the illustration and description of the above write-in operation, eight lines (rows) by eight columns of picture elements are extracted and shown in FIG. 3A. In FIG. 3A, reference numerals "1", "2", "3", ... are shown to indicate the positions of the picture elements which are to be written into the memory 19. The signals of the picture elements at the positions indicated by the reference numerals in FIG. 3A, are written into each of addresses of the memory 19 without gaps as shown in FIG. 3B. Accordingly, compared to the memory capacity (corresponding to 64 picture elements) required for a case where all the picture elements ($8 \times 8 = 64$) are to be written in, the memory capacity of the memory 19 may be $8 \times 4 = 32$ which is one-half the memory capacity required for writing in all the picture elements. Hence, the memory capacity of the memory 19 may be small.

When reading out the signals written into the memory 19 in the above described manner, the signals shown in FIG. 3B are successively read out for every line at the odd fields. Next, the signals shown in FIG. 3B are similarly read out successively for every line at the even fields. As is well known, the odd and even fields are interlaced, and the reproduced picture elements in the reproduced picture may be indicated as shown in FIG. 3C if the reproduced picture elements are indicated by the numbers of the picture elements which are sampled and written into the memory 19.

Figure 3C:
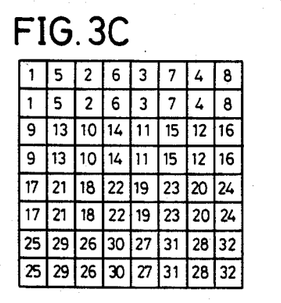

As clearly seen by comparing FIGS. 3C and 3A, picture elements vertically near the picture elements which were not written into the memory 19, are substituted for every other picture element in the reproduced picture which were not written into the memory 19. Generally, information of mutually adjacent picture elements is exceedingly similar, and the correlation is high. Hence, although the vertical resolution becomes lower compared to a case where all the picture elements are written in and read out, the apparent vertical resolution does not become lower. In addition, the apparent sampling frequency does not become low. As a result, the generation of aliasing noise is exceedingly low.

Figure 4A:
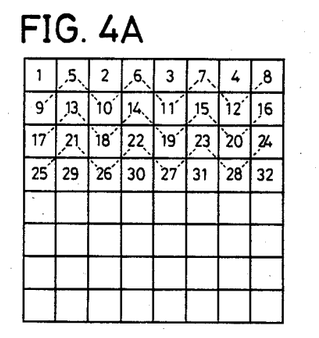
FIGS. 4A and 4B respectively are a diagram showing signals of picture elements written into the memory as in FIG. 3B, and a diagram showing picture elements on a reproduced picture obtained by signals of picture elements read out according to another method.
Figure 4B:
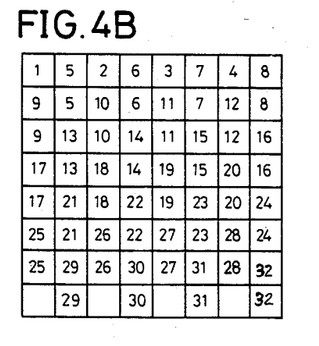

When the reproduced picture is obtaining by reading out from the memory shown in FIG. 3C, the scanning line of the even field and the scanning line of the even field having the same picture element information are adjacent to each other. For this reason, minute flicker may be observed along the vertical direction of the reproduced picture. Hence, a reproducing method of eliminating this problem is shown in FIGS. 4A and 4B. In the present embodiment, the contents (same as those shown in FIG. 3B) of the memory 19 shown in FIG. 4A are successively read out for each line during an odd field period, for example. Next, during an even field period, the contents of the memory 19 are read out from two lines in a zigzag manner as indicated by broken lines in FIG. 4A. Accordingly, a reproduced picture having the picture element arrangement shown in FIG. 4B can be obtained. In actual practice, signals of picture elements in the lower lines enter the empty boxes in FIG. 4B.

According to the present embodiment, lines comprising the same picture elements do not become adjacent to each other, and the problem described previously is eliminated.

Figure 5A:
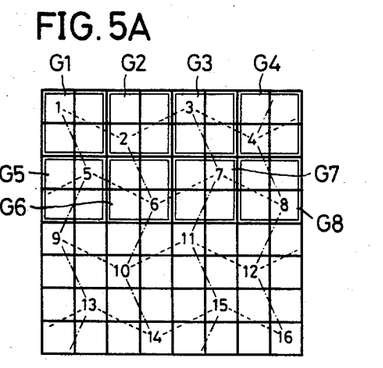
FIGS. 5A, 5B, and 5C respectively are a diagram showing positions of picture elements corresponding to signals of picture elements which are to be written into the memory by a second embodiment of a digital video signal transmitting apparatus according to the present invention, a diagram showing signals of picture elements written into the memory, and a diagram showing picture elements on a reproduced picture obtained by the signals of picture elements read out from the memory.
Figure 5B:
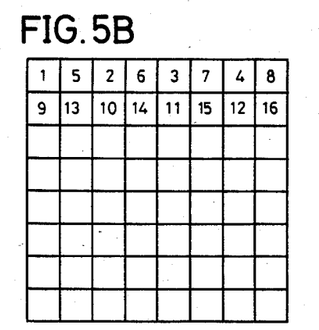
Figure 5C:
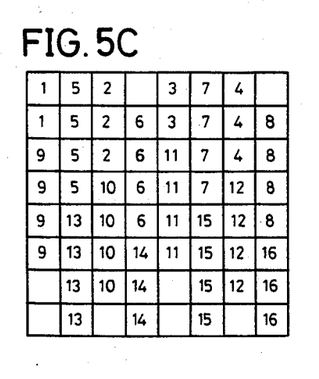

Another embodiment is shown in FIGS. 5A through 5C. In the present embodiment, among four picture element groups G1, G2, G3, and G4 with respect to the first and second lines, the picture elements are successively selected in a zigzag manner in order indicated by numbers 1 through 4, that is, from the picture element at the top left, bottom left, top left, and bottom left of the picture element groups, as shown in FIG. 5A. Among four picture element groups G5, G6, G7, and G8 with respect to the third and fourth lines, the picture elements are successively selected in a zigzag manner in an order indicated by numbers 5 through 8, that is, from the picture element at the top right, bottom right, top right, and bottom right of the picture element groups. Similar selection of picture elements from picture element groups is repeatedly carried out thereafter. Therefore, the picture elements are selected in a zigzag manner between two lines (rows) as indicated by the broken lines in FIG. 5A, and the picture elements are selected in a zigzag manner between two columns as indicated by one-dot chain lines in FIG. 5A.

The signals of the picture elements thus selected, are written into the memory 19 as shown in FIG. 5B. Hence, compared to the memory capacity (corresponding to 64 picture elements) required for a case where all the picture elements ($8 \times 8 = 64$) are to be written in, the memory capacity of the memory 19 may be $8 \times 2 = 16$ which is one-fourth the memory capacity required for writing in all the picture elements. Hence, the memory capacity of the memory 19 may be small.

When reading out the signals written into the memory 19 in this manner, measures are taken so that a reproduced picture having the picture element arrangement shown in FIG. 5C is obtained. As clearly seen by comparing FIGS. 5C and 5A, picture elements vertically near the picture elements which were not written into the memory 19, are substituted for the three picture elements which were not written into the memory 19 among the four picture elements constituting one picture element group in the reproduced picture. Generally, information of mutually adjacent picture elements is exceedingly similar, and the reproduced picture obtained according to the present embodiment is sufficiently fit for practical purposes.

Figure 6A:
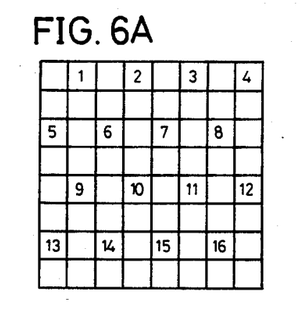
FIGS. 6A, 6B, and 6C respectively are a diagram showing positions of picture elements corresponding to signals of picture elements which are to be written into the memory by a third embodiment of a digital video signal transmitting apparatus according to the present invention, a diagram showing signals of picture elements written into the memory, and a diagram showing picture elements on a reproduced picture obtained by the signals of picture elements read out from the memory.
Figure 6B:
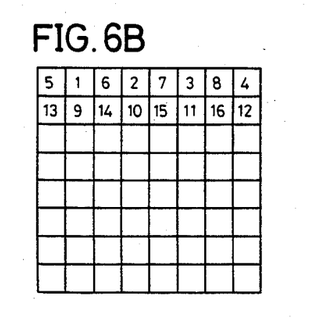
Figure 6C:
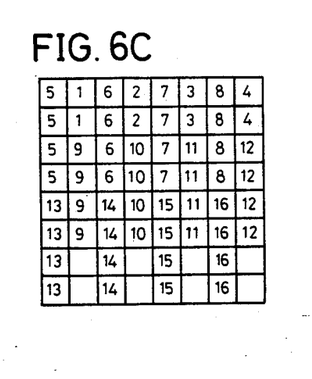

FIGS. 6A through 6C show a further embodiment of the invention. As shown in FIG. 6A, the selection of the picture elements is carried out during the odd field periods of every other line, that is, during the first, third, fifth, and seventh lines, for example, while the picture elements are not written into the memory during the even field periods of the other every other field, that is, during the second, fourth, sixth, and eighth lines. During the above odd field periods, every other of the picture elements are selected the first line. The other every other of the picture elements, that is, the picture elements in the columns which were not selected in the first line, are selected in the next line (third line). Accordingly, the picture elements which are selected are at positions in every other line, and are positioned in a zigzag manner among adjacent columns along the columns.

The signals of the picture elements which are thus selected, are written into the memory 19 as shown in FIG. 6B. Hence, with respect to total number of picture elements (64 picture elements) shown in FIG. 6A, the memory 19 only requires one-fourth the memory capacity necessary to store all the picture elements shown in FIG. 6A.

When reading out the signals written into the memory 19 in this manner, measures are taken so that a reproduced picture having the picture element arrangement shown in FIG. 6C is obtained. As clearly seen by comparing FIGS. 6C and 6A, picture elements vertically near the picture elements which were not written into the memory 19, are substituted for the three picture elements which were not written into the memory 19 among the four picture elements constituting one picture element group in the reproduced picture. Generally, information of mutually adjacent picture elements is exceedingly similar, and the reproduced picture obtained according to the present embodiment is sufficiently fit for practical purposes.

In each of the embodiments described before, the signal reproduced from the disc 11 comprises the signals of all the picture elements, and the picture elements are selected and written into the memory 19 as shown in FIGS. 3A, 5A, and 6A. However, the disc 11 may be recorded with only the signals of the picture elements selected as shown in FIGS. 3A, 5A, and 6A. In this case, the signal reproduced from the disc 11 is written into the memory 19 as it is.

Next, description will be given with respect to an embodiment of a memory controller 20 which controls the memory 19 to carry out the write-in and read-out.

Figure 7:
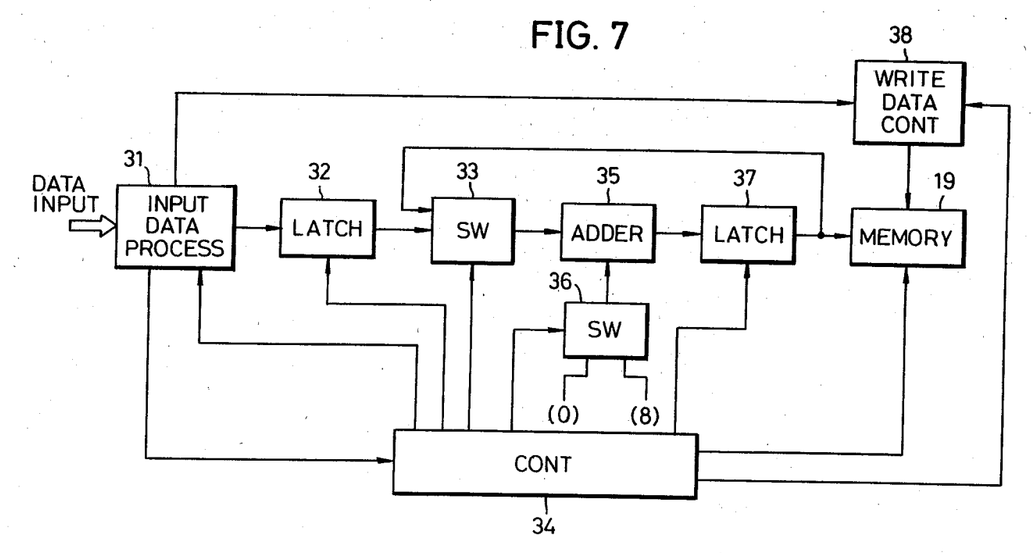
FIGS. 7 and 8 are systematic block diagrams for explaining the operation of a memory controller shown in FIG. 1, during write-in and read-out with respect to the memory.

In FIG. 7, the signal from the decoder 16 is supplied to an input data processing circuit 31. In this embodiment, in order to facilitate the conversion of the scanning lines between the PAL system and the NTSC system with a ratio of 6:5, the signals of the picture elements are recorded in the order along the vertical direction and not along the horizontal direction, and the signals of the picture elements are obtained from the decoder 16 in this order. An address signal is added for each of the columns at the respective beginnings of the columns. The address signal is latched at an address latching circuit 32. When the address signal of the first column is detected, a switching circuit 33 passes the address (1) which is the output of the latching circuit 32, and the address (1) is supplied to an adder 35. With respect to each of the picture elements shown in FIG.

3A, addresses (1), (2), ..., (8) are assigned to the picture elements in the first line in the horizontal direction from the first column, and addresses (9), (10), ..., (16) are assigned to the picture elements in the second line in the horizontal direction from the first column, and the addresses are assigned similarly thereafter for each of the lines. Hereinafter, the addresses are indicated in brackets ( ), and the numbers of the picture elements which are selected in FIG. 3A are indicated in quotation marks " ".

The address of the picture element "1" is (1), and at this point in time, a switch 36 applies an address (0) to the adder 35. Accordingly, the address (1) which passes through the switch 33 is supplied to a latching circuit 37 with the address as it is, and applied to the memory 19. Hence, the signal of the picture element "1" is written into the memory 19 through a write-in data controller 38. Next, when the signal of the picture element at the address (9) is obtained, the data processing circuit 31 does not pass the signal of the picture element to the controller 38 and culls or decimates the signal of the picture element under the control of the controller 34. At this point in time, the switch 33 is switched over so as to pass the output of the latching circuit 37, while the switch 36 is switched over so as to apply the address (8) to the adder 35. As a result, the adder 35 produces the address (9) (=1+8).

Next, when the signal of the picture element "9" at the address (17) is supplied to the processing circuit 31, the address (17) (=9+8) is obtained at the adder 35, and the signal of the picture element "9" at the address (17) is written into the memory 19. Similarly thereafter, the signals of the picture elements in the first column are written into the memory for every other address.

When the signal of the second column is applied to the input data processing circuit 31, it is detected that the signal is a signal of the second column due to the address signal at the beginning thereof. Hence, the signal of the first picture element (the signal of the picture element at the address (2)) is not supplied to the controller 38 and is decimated at the controller 34. At this point in time, the address (0) is supplied to the adder 35 from the switch 36, and the output of the latching circuit 37 indicates the address (2). Next, when the signal of the picture element (5) at the address (10) is supplied to the input data processing circuit 31, the switch 36 supplies the address (8) to the adder 35, and the address (10) (=2+8) is obtained from the adder 35. Thus, the signal of the picture element "5" at the address (10) is written into the memory 19. Similarly thereafter, the signals of the picture elements are written into the memory 19 as shown in FIG. 3B.

Figure 8:
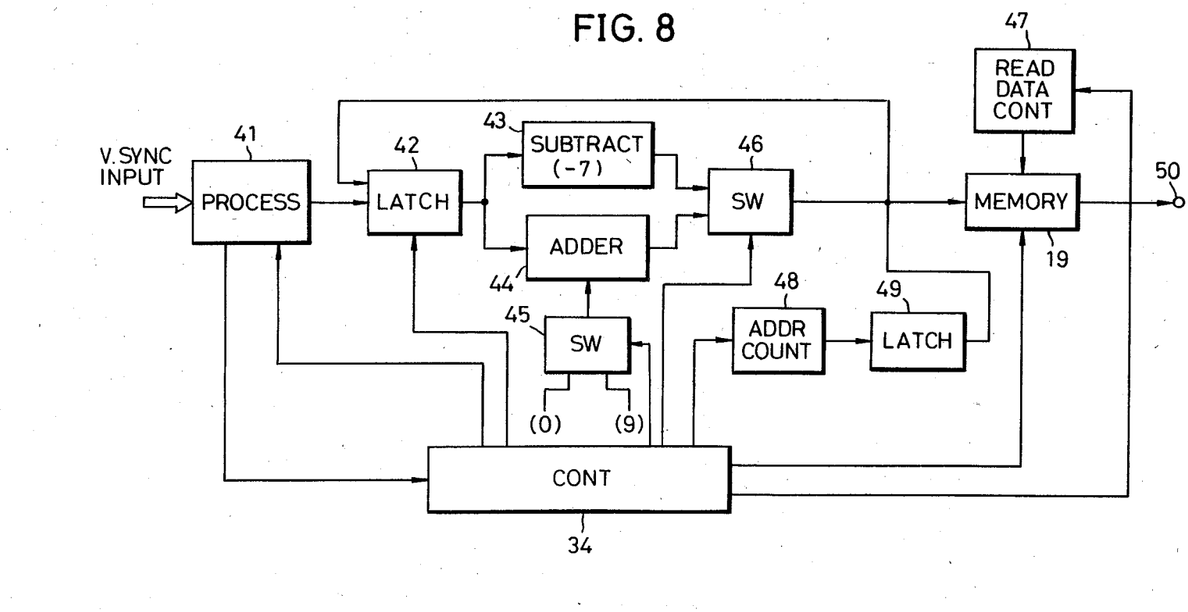

Description will now be given with respect to an embodiment of the memory controller 20 which reads out the signals written into the memory 19 in the manner described heretofore, by referring to FIG. 8. A vertical synchronizing signal is supplied to a processing circuit 41. When the read-out is to be carried out as shown in FIG. 3C, an address counter 48 increments the address by (1) by the output of the controller 34. An output of the address counter 48 is applied to the memory 19 through a latching circuit 49. During the odd field, the signals stored in the memory 19 by a read-out data controller 47 are successively read out from the first column with respect to each line in FIG. 3B. During the next even field, the signals are similarly read out successively with respect to each of the lines. The signal read out from the memory 19 is supplied to the D/A converter 21 shown in FIG. 1 from an output terminal 50. Hence, a reproduced picture having the picture element arrangement shown in FIG. 3C is obtained.

When the signals written into the memory 19 as shown in FIG. 4A (FIG. 3B) are to be read out as shown in FIG. 4B, the address counter 48 first increments the address by (1) as in the above case during the odd field, and the signals of the picture elements shown in FIG. 4A are successively read out.

Next, during the even field, the address obtained through a latching circuit 42 is supplied to a subtracting circuit 43 wherein an address (7) is subtracted, that is, where an address (−7) is added. The address obtained through the latching circuit 42 is also supplied to an adder 44 wherein an address obtained through a switch 45 is added. Outputs of the subtracting circuit 43 and the adder 44 are alternately obtained through a switch 46. First, the switch 45 supplies the address (0) to the adder 44 with respect to the address (9), and the output address (9) of the adder 44 is applied to the memory 19 through the switch 46. Accordingly, the signal of the picture element "9" at the address (9) is read out by the read-out data controller 47. This address (9) is supplied to the subtracting circuit 43 and the adder 44 through the latching circuit 42. The address (2) (=9−7) is obtained from the subtracting circuit 43, and the added result between the address (9) supplied through the switch 45 is obtained from the adder 44. However, the switch 46 is switched over by the controller 34 at this point in time to pass the output of the subtracting circuit 43. Thus, the address (2) is applied to the memory 19. Hence, the signal of the picture element "5" at the address (2) is read out from the memory 19.

This address (2) is supplied to the subtracting circuit 43 and the adder 44, through the latching circuit 42. At this point in time, the switch 46 is switched over to pass the output of the adder 44. Thus, the address (11) which is the added result obtained by adding the adddress (2) with the address (9) obtained through the switch 45, is applied to the memory 19. Therefore, the signal of the picture element "10" at the address (11) is read out from the memory 19. Similarly thereafter, the signals of the picture elements "6", "11", "7", "12", "8", ... at the addresses (4), (13), (6), (15), (8), ... are read out from the memory 19. As a result, a reproduced picture having the picture element arrangement shown in FIG. 4B is obtained.

In actual practice, the number of picture elements is much larger than the number in the embodiments described heretofore. For example, if the number of picture elements in one line is 72, an address (72) is applied to the adder 35 through the switch 36 instead of the address (8), and the subtracting address at the subtracting circuit 43 shown in FIG. 8 is set to an address (−71) instead of the address (−7). In addition, in this case, an address (73) is applied to the adder 44 through the switch 45 instead of the address (9).

Further, the present invention is not limited to these embodiments, and various variations and modifications may be made without departing from the scope of the present invention.

What is claimed is:

1. A digital video signal transmitting apparatus comprising:

a memory which is written in with a digital video signal of selected picture elements, said selected picture elements being selected from among all picture elements arranged in a matrix form constituting one picture frame, said selected picture elements being arranged at zigzag positions along either a horizontal direction or a vertical direction in said matrix form arrangement, said one picture frame comprising said selected picture elements and unselected picture elements which exist between said selected picture elements along the horizontal and vertical directions in said matrix form arrangement of all the picture elements; and control means for carrying out read-out control to read out a digital video signal, said control means carrying out the read-out control so that signals of said selected and written in picture elements are read out as they are from said memory, and signals of selected and written in picture elements near picture elements which were not selected and not written in are read out to substitute for signals of the picture elements which were not selected and not written in.

2. A digital video signal transmitting apparatus as claimed in claim 1 in which said memory is supplied with a digital video signal of all the picture elements constituting said one picture, and said control means carries out control so that picture elements arranged at said zigzag positions among said matrix form arrangment of all the picture elements are selected and written into said memory during write-in to said memory.

3. A digital video signal transmitting apparatus as claimed in claim 1 in which said memory is supplied with a digital video signal of picture elements arranged at said zigzag positions among said matrix form arrangement of all the picture elements during write-in to said memory.

4. A digital video signal transmitting apparatus as claimed in claim 1 in which a digital video signal supplied to said memory is a signal reproduced from a recording medium which is recorded with said digital video signal.

5. A digital video signal transmitting apparatus as claimed in claim 1 in which said memory is written in with a digital video signal of picture elements of every other line (row) and every other column selected from among all the picture elements in each of lines and each of columns constituting one picture frame.

6. A digital video signal transmitting apparatus as claimed in claim 1 in which said memory is written in with a digital video signal of every other picture element in a zigzag arrangement along the horizontal and vertical directions in the matrix form arrangement of all the picture elements constituting one picture, selected from among all the picture elements constituting said one picture frame.

7. A digital video signal transitting apparatus as claimed in claim 1 in which said memory is written in with a digital video signal of every other picture element in every other line along the horizontal direction in the matrix form arrangement of all the picture elements constituting one picture and picture elements in a zigzag arrangement between adjacent columns along the vertical direction in said matrix form arrangement of all the picture elements constituting said one picture, selected from among all the picture elements constituting said one picture frame.

* * * * *